L. J. STEELE, H. MARTIN, AND A. E. McCARTHY.
ELECTRIC WELDING.
APPLICATION FILED JUNE 21, 1920.

1,410,421.

Patented Mar. 21, 1922.
12 SHEETS—SHEET 6.

Inventors
Louis John Steele,
Harold Martin, and
Andrew Edward McCarthy
by
W. E. Evans
Attorney.

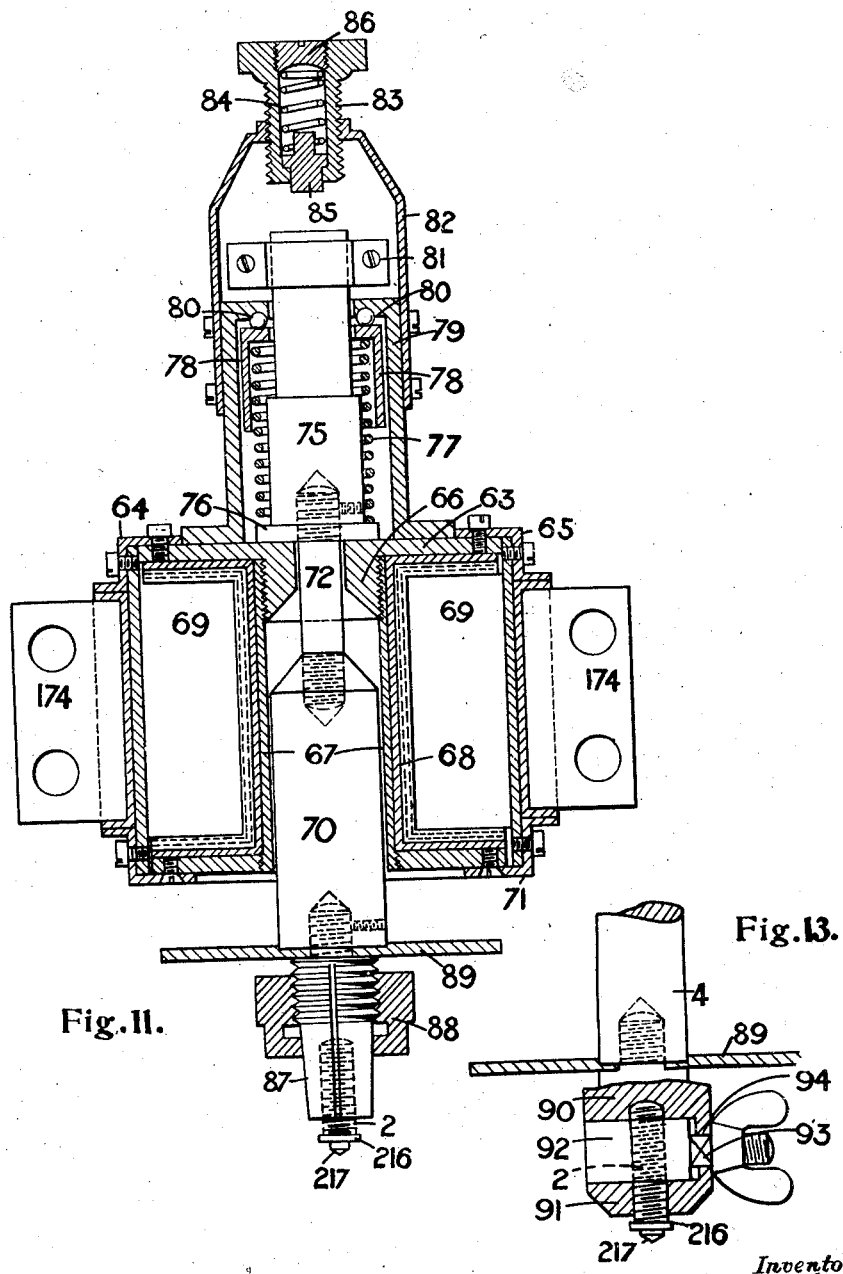

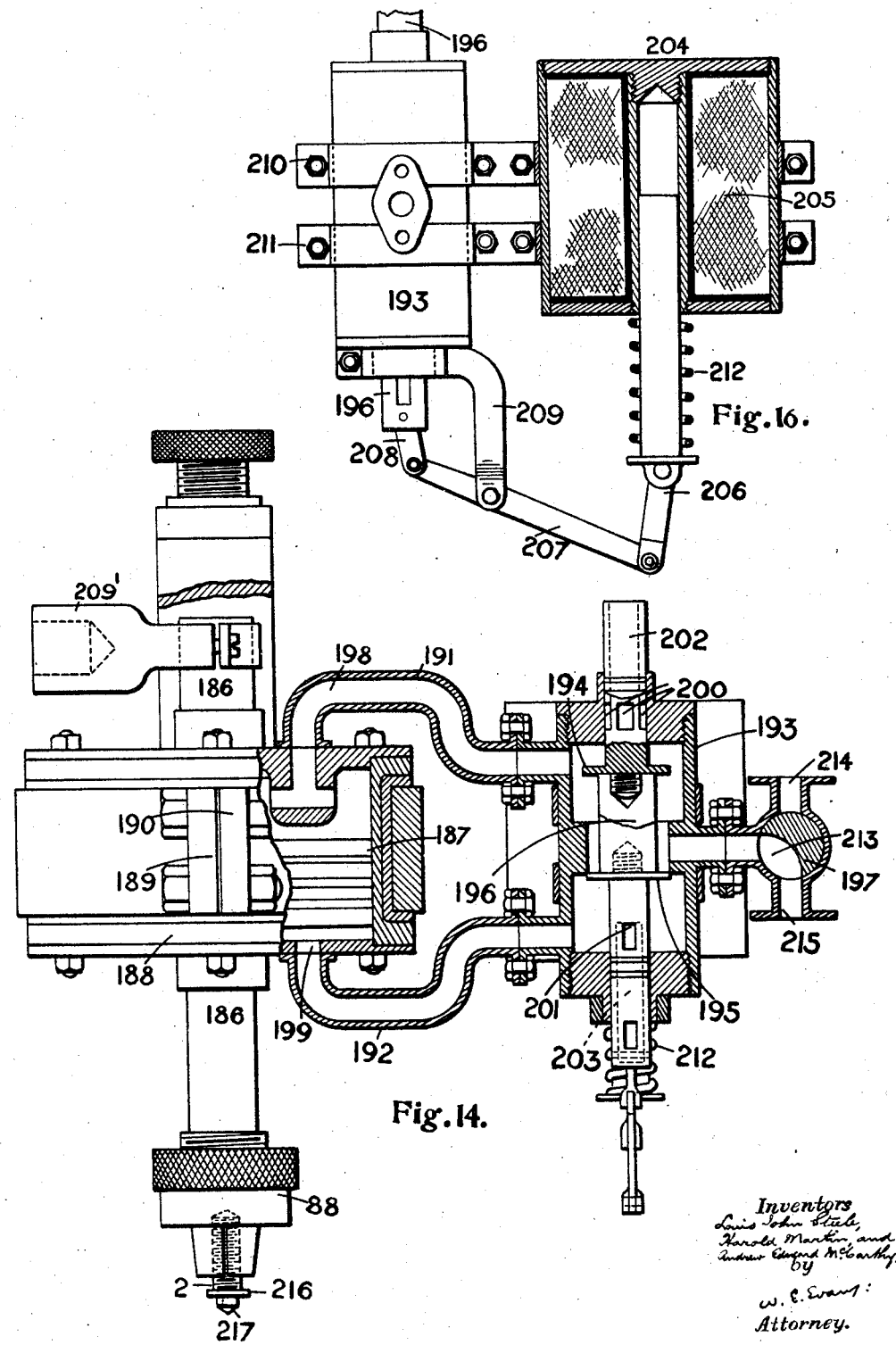

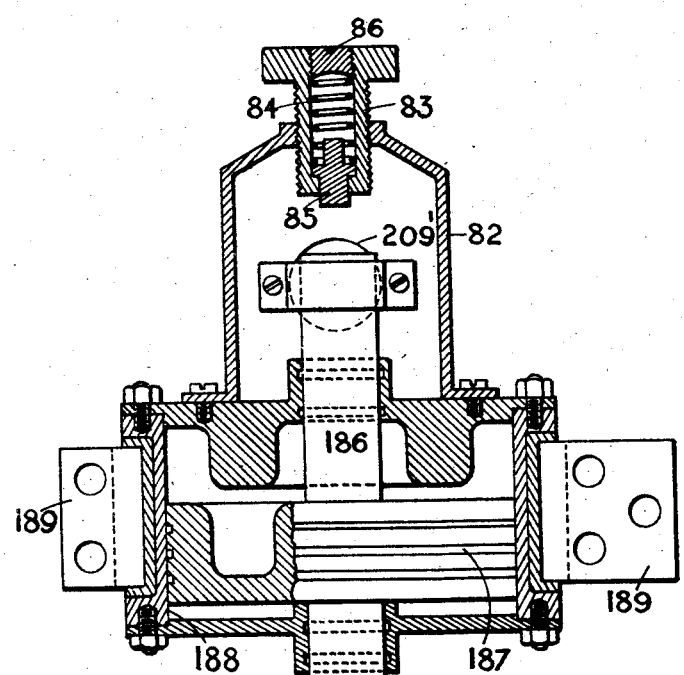
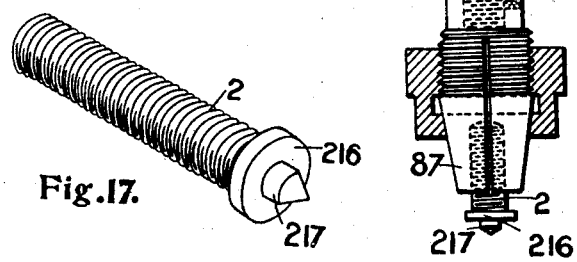
Fig. 15.
Fig. 17.

UNITED STATES PATENT OFFICE.

LOUIS JOHN STEELE, OF PORTSMOUTH, AND HAROLD MARTIN AND ANDREW EDWARD McCARTHY, OF SOUTHSEA, ENGLAND.

ELECTRIC WELDING.

1,410,421. Specification of Letters Patent. Patented Mar. 21, 1922.

Application filed June 21, 1920. Serial No. 390,555.

*To all whom it may concern:*

Be it known that we, LOUIS JOHN STEELE, HAROLD MARTIN, and ANDREW EDWARD MC-CARTHY, subjects of the King of Great Britain and Ireland, residing, respectively, at H. M. Dockyard, Portsmouth, in the county of Hants, England, 15 Helena Road, Southsea, in the county of Hants, England, and Lyonsdown, Haslemere Road, Southsea, in the county of Hants, England, have invented certain new and useful Improvements in or Relating to Electric Welding, of which the following is a specification.

This invention relates to a process or method of electric welding and to apparatus for use therein, the invention being more especially applicable for use in the insertion or welding of metal studs of iron, steel or brass to or into metal bodies, whether forged or cast, such as metal sheets, plates, bars, blocks, forgings and castings.

According to the present invention an electric arc is formed between the metal stud and the metallic body to which the stud is to be welded, and the said arc and current are maintained for a suitable length of time, the period of which is automatically controlled, and subsequently but before interrupting the flow of the main current or welding current, the molten metal stud end is forced through the path or direction of the arc against the portion of the metal body rendered molten by the arc by electrically, mechanically or pneumatically actuated means. For convenience in description the metal body to which the stud is to be welded is hereinafter referred to as the plate.

The apparatus broadly comprises two main parts, first a stud moving and arc striking mechanism which may comprise a solenoid the plunger of which is formed as or adapted for use as a stud-holder or has a stud-holder removably attached thereto and holding-on apparatus mechanical or electrical, these two parts being preferably combined to form a single unit and second a controlling and timing apparatus which permits of the sequence of operations being automatically controlled to any desirable degree of accuracy and also allows of the said operations being controlled from a distance.

In operation, the stud in the stud-holder is held in position against the plate, the holding-on or pot-magnets being energized at this particular time, so as to retain the apparatus in position. Current is then switched on to the main circuit including the stud and plate simultaneously energizing the solenoid-coil. Immediately the solenoid-coil is energized the stud carried by the solenoid-core is withdrawn against the action of the spring (the tension of which may be adjustable) and the arc is struck to a predetermined length which is dependent on the dimensions and setting of the spring-pressed plunger in the screwed pin or plug of the stroke adjusting or setting means. On the solenoid-coil being shunted or short circuited, or open circuited or otherwise de-energized the spring returns the stud through the path or direction of the arc against and preferably at right angles to the plate and with sufficient pressure to effect the welding of the stud in position on the plate. The arc through the path or direction in which the stud is returned is thus maintained though being shortened until actual contact takes place between the stud and plate. The solenoid-coil may be de-energized by short circuiting its ends or by opening the solenoid-circuit. The former method gives satisfactory results and obviates sparking at the contact or contacts of the timing apparatus but necessitates the introduction of a non-inductive resistance in the solenoid-circuit. As an alternative method of operation, the action of the solenoid may be such as to force or draw the stud on to the plate, in which case the stud may be normally held away from the plate by a spring. The sequence of timing operations in the latter method would be somewhat as follows. Assuming that the welding apparatus is held or fixed in position against the plate, the circuit through the solenoid-coil is closed thus energizing the solenoid and overcoming the pressure of the spring so that the stud is forced into contact with the plate. The main circuit is then closed by means of the remote controlled contactor the stud-holder solenoid-coil being at the same time de-energized thus enabling the spring to operate and strike the arc. The stud-holder-solenoid is then re-energized and the stud is replaced with the arc still maintained. The main circuit is now broken by means of the contactor and the stud-holder-solenoid-coil finally de-energized. After the final operation the stud-holder obviously could not return to its original position as the result of the action of the spring until the stud holder has been disconnected from the stud which has now been welded to the plate. The arrangement and construction hereinbefore described enables the pressure on replacement of the stud through its arc to be varied in proportion to the size of the solenoid and the amount of current flowing through the solenoid.

Further, a combination of the two aforesaid methods may be used, in which a small shunt or series solenoid would be used for striking the arc and a larger and more powerful solenoid to return the stud and force it into the plate or other metallic body under strong mechanical pressure. In this form a light spring would preferably be used to hold the stud in position against the plate or other metallic body before striking the arc thereby avoiding any necessity for energizing the powerful return solenoid until after the arc has been struck and maintained and conditions are such as to enable the weld to be effected.

By means of the timing apparatus the main circuit in either arrangement may be broken immediately on replacement of the stud if it is desired to avoid the heavier currents which flow on replacement of the stud provided that the annealing effect of such currents is found to be unnecessary. Otherwise, the main current may be maintained after the weld is made.

The whose sequence of operations may be controlled at the welding apparatus by means of a push button or its equivalent which on being pressed closes the circuit through a solenoid which releases a brake on the cam shaft of the timing apparatus thus permitting the cam-shaft carrying the cams to make one complete revolution during which period the whole of the operations of the welding apparatus are controlled, the said welding apparatus and the timing device returning to the initial position from which the sequence of operations started.

A shield may be provided for protecting the arc from magnetic effects and/or air currents. This may be effected by enclosing the stud-holder and arc in a suitably insulated casing which may be of steel, iron or other suitable metal or if desired of refractory material.

The control and timing apparatus may be actuated electrically or mechanically or part electrically and part mechanically.

The best results as regards uniform reliable welds of high mechanical strength have been obtained by providing a shoulder of circular form at the plate end of the stud and a small circular part projecting therefrom, the said projecting part being slightly rounded or bevelled off so as to facilitate the striking and centralization of the arc. The welding end or the shoulder thereof or both the end and shoulder of the stud may be suitably coated with a suitable flux composition.

The apparatus may be of a portable or stationary nature, holding on or pot-magnets being preferably provided when the apparatus is in its portable form and is intended for use with iron or steel plates. The holding-on or pot-magnets in other cases may be omitted, and the apparatus may be so constructed and arranged that it can be supported in position by any suitable mechanical means such as on a post drill or on a radial drill or if desired by means of a tripod and may be used in a vertical, horizontal or inclined position, means being provided to allow the position of the operating solenoid to be varied relative to that of the plate in order to suit different lengths of studs.

Two or more welders or welding apparatus constructed as hereinbefore described may be used sequentially or randomly and controlled mechanically and/or electrically from the same timing and controlling mechanism. This may be effected electrically by means of a discriminating switch which may be of the rocking magnetic type interposed in the push button circuit.

The electrical and mechanical timing and controlling mechanism hereinbefore described may be replaced by fluid controlling and timing mechanism, such mechanism being capable of operating on vacuum compressed air, oil, water or other suitable hydraulic means, operating to perform or effect the required sequence of operations as hereinbefore set forth. In this constructional form the stud-holder would be mounted on the piston-rod of a piston or diaphragm of an actuating cylinder, which would be connected by suitable piping with or without controlling valves to a hydraulic or compressed air supply piping. If desired the apparatus may be retained in position on the plate or metallic body by means of reduced pressure or vacuum apparatus.

The apparatus may be used with direct or alternating current and the control circuits of the apparatus can be operated from a source of current supply entirely independent of that of the welding current supply, such for example as a comparatively low voltage battery, or transformer supply which can be used on the main welding circuit, with a higher voltage supply on the control circuit. If a common source of supply be used on both circuits in conjunction with the shunt solenoid operation, the arc solenoid would be directly energized from the main contact of the contactor when the latter is closed. If separate circuits be used the arc solenoid may be energized from an auxiliary contact on the contactor which, however, may be in turn made "alive" by the closing of the contactor.

We will describe with reference to the accompanying drawings, apparatus in accordance with the present invention but we do not limit ourselves to the precise arrangements and constructions described and illustrated.

Figures 11 and 12 are respectively a sectional elevation of the arc-striking solenoid and the wiring diagram in connection with this type of apparatus.

Figure 13 shows an alternative form of stud-holder.

Figures 14 and 15 show an elevation partly in section and a vertical section through the stud-holder of a pneumatically actuated type of apparatus.

Figure 16 is an elevation partly in section of the solenoid-operated valve for use with the apparatus of Figures 14 and 15, and Figure 17 is a perspective view of a preferred form of stud for use in carrying out the present invention.

Figure 1:
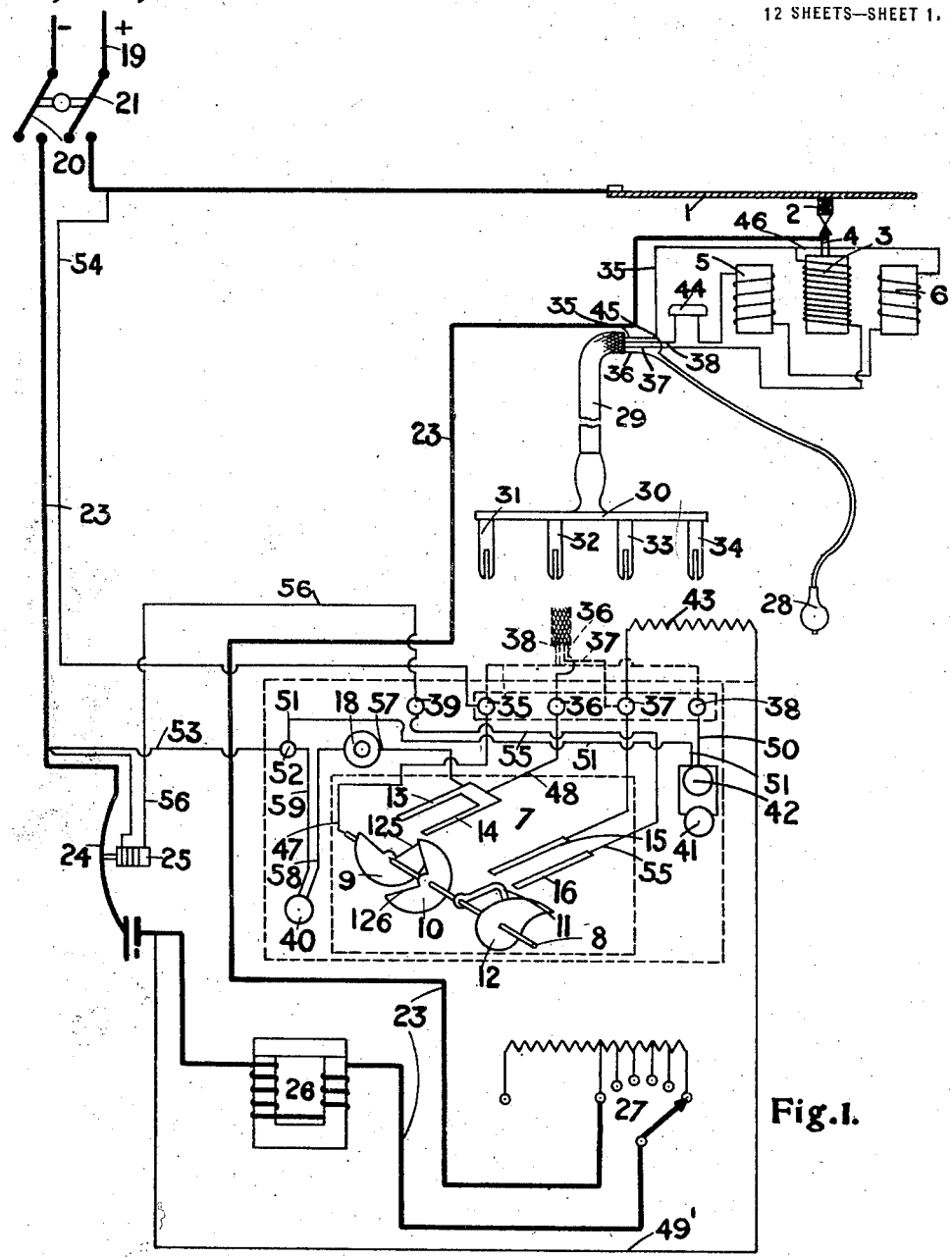
Figure 1 shows a general arrangement and wiring diagram of a portable type of apparatus.
Figure 2:
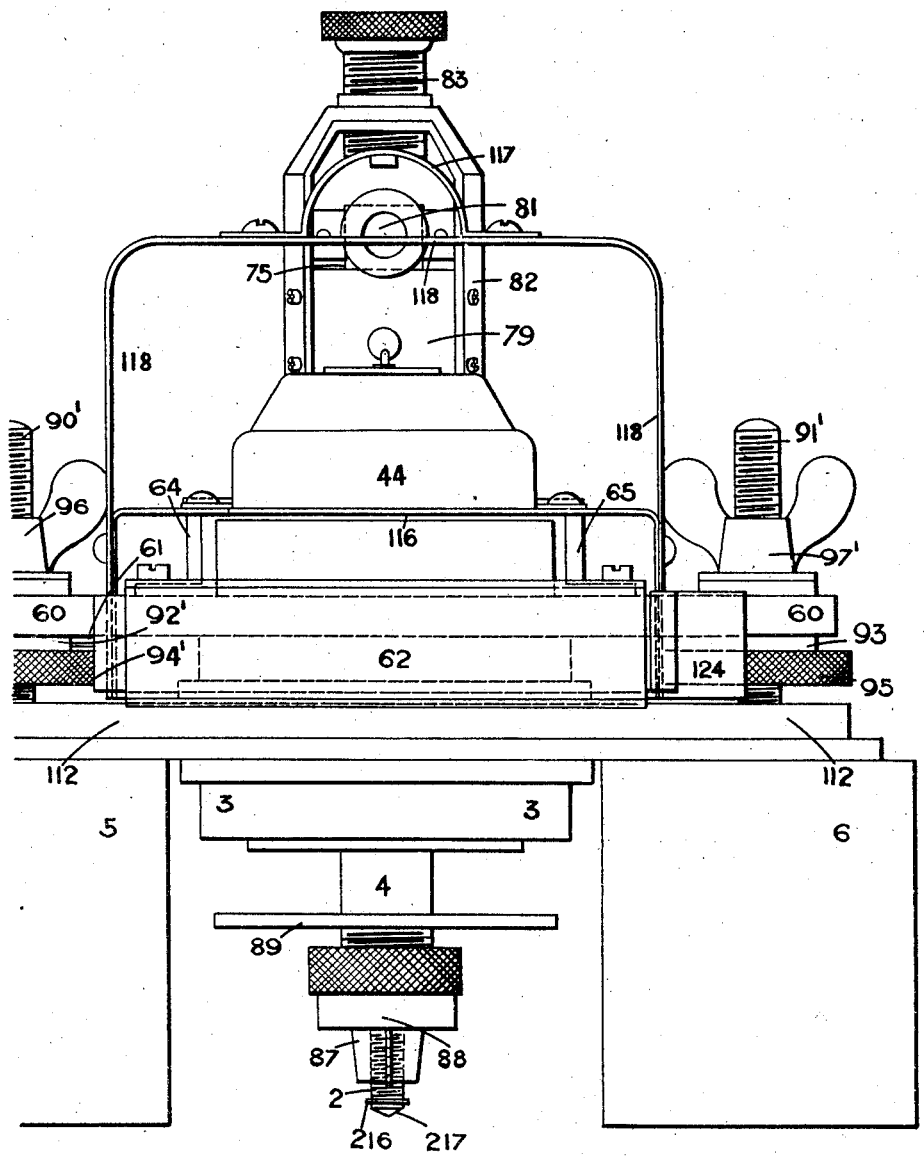
Figure 2 is an elevation of the holding-on apparatus or pot-magnets.

Referring to Figure 1 of the drawings, 1 is the plate to which the stud 2 is to be welded. 3 is a solenoid the plunger or core 4 of which is adapted to act as a holder for the stud 2 either by forming the core end as a split conical chuck or by means of a split conical chuck capable of being removably attached to the said plunger or core 4. The solenoid 3 carrying the stud 2 is clamped in position against the plate 1 by holding-on pot-magnets 5, 6 arranged one on each side of the solenoid the coils of the said holding-on-pot-magnets being energized from any suitable source of electric energy. 7 indicates generally an automatic timing or control mechanism hereinafter fully described and comprising a cam-shaft 8, cams 9, 10, 11 and 12 adapted to engage contact terminal levers of fingers 13, 14, 15 and 16 on rotation of the cam-shaft. The latter may be rotated by clock-work mechanism as described with reference to Figures 6, 7 and 8; or the said cam-shaft 8 may be suitably rotated electrically. Rotation of the cam-shaft is prevented unless at the proper time by a brake 17 (Figures 6 and 8) which is released on the energization of a solenoid 18 (Figures 1, 6, 7 and 8). The positive and negative main leads are indicated at 19, 20. 21 is a double-pole switch for connecting the apparatus in the main circuit. Obviously the polarity of the leads 19, 20 may be reversed and in the case of alternating current being used no definite polarity can be assumed for the apparatus main leads 22, 23. The plate 1 and the stud-holder are electrically connected thereto through positive and negative leads 22, 23 and a contactor-switch 24 electro-magnetically actuated by a solenoid 25. The positive lead 22 is connected directly to the plate 1 a suitable reactance coil 26 and a variable resistance 27 being inserted in series in the negative lead 23 between the contactor 24 and the stud-holder. In Figure 1 the main leads and the welding circuit are shown in heavy black lines to distinguish these circuits from the other circuits of the diagram. The function of the reactance coil 26 is to delay and oppose heavy rushes of current so as to obviate sticking of the stud on the plate due to too rapid a rise in the value of the current. By means of the variable resistance 27, the value of the main current can be controlled or regulated to suit different sizes and material of studs and plates and other variable conditions such as temperature. The leads from the solenoid 3, holding-on-pot-magnets 5, 6 and main control switch 28 shown as a pear-push switch are collected in a common flexible cable 29 which is provided with a terminal bracket 30 having four plug switches 31, 32, 33 and 34 adapted to engage in plug sockets 35, 36, 37 and 38 which may be mounted on and secured to a box (not shown) carrying the timing mechanism 7. The variable resistance 27, the reactance coil 26, the contactor 24 and the contactor actuating solenoid 25 may also be carried in the same box for convenience. 39 indicates a contact terminal mounted on the box or receptacle (not shown) containing the plug sockets 35, 36, 37, and 38, reactance coil 26, variable resistance 27 and timing mechanism 7, the said contact terminal 39 being employed for the closing of the circuit through the solenoid 25 operating the contactor 24. 40, 41, 42 are conveniently lamp resistances and 43 is a non-inductive resistance. The lamp 40 lights up on actuating the push switch 28 and is thus a convenient indicator that the timing apparatus is in operation. The leads from the plug sockets 35, 36, 37 and 38 and the corresponding leads from the plug terminals 31, 32, 33 and 34 to the solenoid 3, the holding-on-pot-magnets 5 and 6 and the main control switch 28 are indicated for convenience by the same reference numerals as the plug sockets themselves. In Figure 1 a part of the cables 29 is shown dotted below the bracket 30 carrying the plug terminals 31, 32, 33 and 34 so as to clearly indicate the arrangement and connection of the leads to the plug terminals and the latter to the plug sockets 35, 36, 37 and 38. The circuit through the holding-on-pot-magnets 5 and 6 may be closed by means of a switch 44, which although indicated as a tumbler switch may be of any suitable nature. The circuits through the main control switch 28 and the holding-on-pot-magnets are branched from the positive lead 35 as at 45 the circuit through the solenoid-coil 3 being tapped from the lead 35 as shown at 46. The lead 35 is electrically connected through the plug socket 35 to the cam-shaft 8 by a wire 47, the lead 36 through the socket 36 to the contact levers or fingers 13 and 14 by a wire 48 and the lead 37 through the socket 37 to the contact finger 15 by a wire 49 or by the non-inductive resistance 43 and wire 49' to the contactor 24 and negative lead 23. The lead 38 is electrically connected through the socket 38, lead 50, lamps 41 and 42 to the common negative contact terminal 52 by the wire 51 the contact terminal 52 being connected to the common negative lead 23 by a wire 53. The circuit through the contactor actuating solenoid 25 is connected by the wire 54 from the positive lead 22 through the plug socket 35, wire 47, camshaft 8, cam 12 thereon, contact finger 16 and wire 55 to the terminal 39 and from thence to the lead 23 by the wires 56. The circuit through the brake releasing solenoid 18 is by way of the wire 54 from the lead 22, plug socket 35, wire 47, cam-shaft 8 of the timing mechanism 7 cams 9 (or 10) contact finger 13 (or 14) wire 57 brake release solenoid 18, wire 58, lamp 40, wire 59, common negative terminal 52 and thence to the apparatus negative lead 23 by wire 53. The circuit through the press-button switch 28 bridges the gap between the cams 9 and 10 and the contacts 13, 14 in the circuit of the brake release solenoid 18 which gap exists when the timing mechanism is inoperative or at rest. The circuit through the press-button-switch 28 is by wire 54 from lead 22, plug socket 35, plug terminal 31, lead 35, point 45, press-button-switch 28, lead 36, plug terminal 32, plug socket 36, wire 48, wire 57, brake release solenoid 18, wire 58, lamp 40, wire 59, negative contact terminal 52 and thence to apparatus negative lead 23 by wire 53.

The stud-holder solenoid 3 in Figures 2, 3, 4 and 5 and the holding-on-pot-magnets 5, 6 are mounted on and supported by a common frame or carrier 60 to which is suitably secured a flat metal bar 61 having an ebonite fibre or other suitable handle 62 so that the solenoid-stud-holder and holding-on-pot-magnets form a single and portable unit which can be easily carried about from place to place as desired. The stud-holder solenoid comprises a cover 63 Figure 5 which is secured to the carrier frame 60 by brackets 64, 65 suitably mounted on and secured to the said carrier frame. The solenoid cover 63 is provided with a central boss 66 onto which is screwed a copper tube 67 surrounded by a former 68 on which the coil 69 is wound, insulating material 70 being disposed between the former and the coil 69. The former 68 is retained in position by a disc 71 screwed to the free or outer end of the copper tube 67. The boss is provided with a central opening through which passes a pin 72 adapted to carry the solenoid core or plunger 4. The coil 69 is surrounded by a steel casing 73 maintained in position in an openig in the carrier frame 60 by screws 74 Figures 3 and 4. The upper or rear end of the pin 72 is provided with a contact terminal pin 75 having a disc 76 which is forced against the solenoid cover plate 63 by a spring 77 enclosed in an annulus 78 slidably disposed in an enclosing cap 79 or cover. If desired ball bearings 80 may be disposed between the adjacent end faces of the annulus 78 and the enclosing cap 79. A terminal clamp 81 is suitably secured to the rear end of the contact terminal pin 75 which rear end projects beyond the enclosing cap or cover 79. To the latter is secured a bridge piece 82 open on opposite sides and carrying means for setting or obtaining the correct length of stroke of the arc. The stroke setting means comprises a screwed plug 83 carrying a helical spring 84 in its interior, the said spring being retained in the hollow interior of the screwed plug 83 by a screwed cap 86. The inner end of the spring 84 abuts against a slidable plunger 85 which is so constructed that the portion which projects from the screwed plug 83 gives the correct length of arc on striking thereof. By rotating the screwed plug 83 so that the plunger 85 is just in contact with the terminal pin 75 when the apparatus is set up, for welding the correct length of arc will subsequently be struck.

The outer end of the core 4 or plunger is provided with a split conical chuck to receive the stud, the respective members of the chuck being indicated at 87, 88. A suitable iron or steel disc 89 is interposed between the chuck and the core 4 or plunger, to reduce magnetic leakage from the core 4 in relation to the arc. An alternative form of stud-holder is shewn in Figure 13. In this construction the outer end of the core 4 or plunger is provided with an axial recess 90 and a transverse circular recess 91. In the transverse recess is arranged a pin 92 having a squared end 93 adapted to engage in a square recess 94 formed in the wall of the core 4 and at the end of the circular recess so as to clamp the stud in the holder or core 4. The welding current may be delivered to the clamping socket 81 thus providing a central supply; or the cable carrying the welding current may be suitably connected to the washer 89 or disc. If a central supply be employed the pin 72 is of brass and therefore it is unnecessary to have any tube such as 89' Figure 5 between the core 4 or plunger of the solenoid 3 and the adjacent casing, in which case the core 4 would be slidably fitted in the copper tube 67 as shewn in Figure 11. If, however, the welding current be delivered to and through the disc 89, the pin 72 and the said tube 89' are of suitable insulating material, so that the welding current makes alive the disc 89, the core 4 and the stud holder only. The inner end of the core 4 or plunger is of conical form and a suitable space is left between the core-end and the boss 66 on the solenoid-cover 63 so as to allow for adjustment of the stroke and also striking of the arc.
The holding-on-pot-magnets 5, 6 are supported by the carrier frame 60 by screws 90', 91' which are adjustably mounted in and insulated from the said carrier frame 60, 92', 93' being the respective insulating bushes.
The adjusting means comprise knurled nuts 94', 95, and thumb nuts 96, 97. To the lower end of the screws 90' and 91' are secured cover plates 98, 99 respectively Figure 5, which are screwed into mild steel casings 100, 101. Each of the mild steel casings is open at its lower end and surrounds a coil of wire wound on a former. 102 is the coil of the holding-on-pot-magnet 5 and 103 is the coil of pot-magnet 6. Each of the coils 102, 103 is wound on a former 104, 105 in the form of a bobbin the respective coils being separated from their formers by insulating material 106, 107. The cover plates 98, 99 are provided with cores 108, 109 rigid therewith and extending to and projecting beyond the outer flange of the respective formers. To the said cores are secured brass discs 110, 111 so as to retain the formers and cores in position. The cover plates 98, 99 for the pot-magnets are supported by a brass angle frame 112 which surrounds and guides the solenoid 3 and is insulated therefrom by an insulating bush 113. The frame 112 carrying the pot-magnets and the insulating bush 113 are slidably mounted relatively to the casing of the solenoid 3. 114, 115 are clamping nuts mounted on the screws 90, 91. The coils of the pot-magnets 5, 6 and the coil of the solenoid 3 are preferably so wound or connected as to give the same polarity at the ends of the cores adjacent the plate 1.

The tumbler switch 44 is mounted on a bridge piece 116 extending between the side arms of the flat bar 61 connected to the carrying frame 60.

Figure 3:
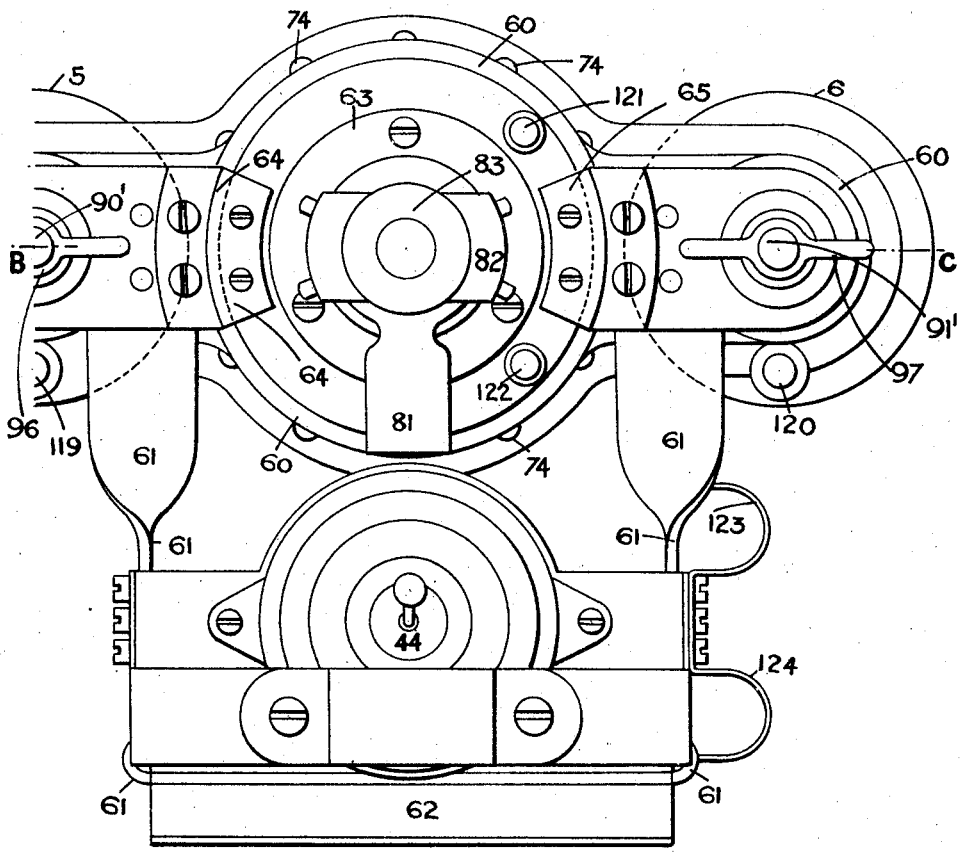
Figure 3 is a plan of Figure 2.
Figure 4:
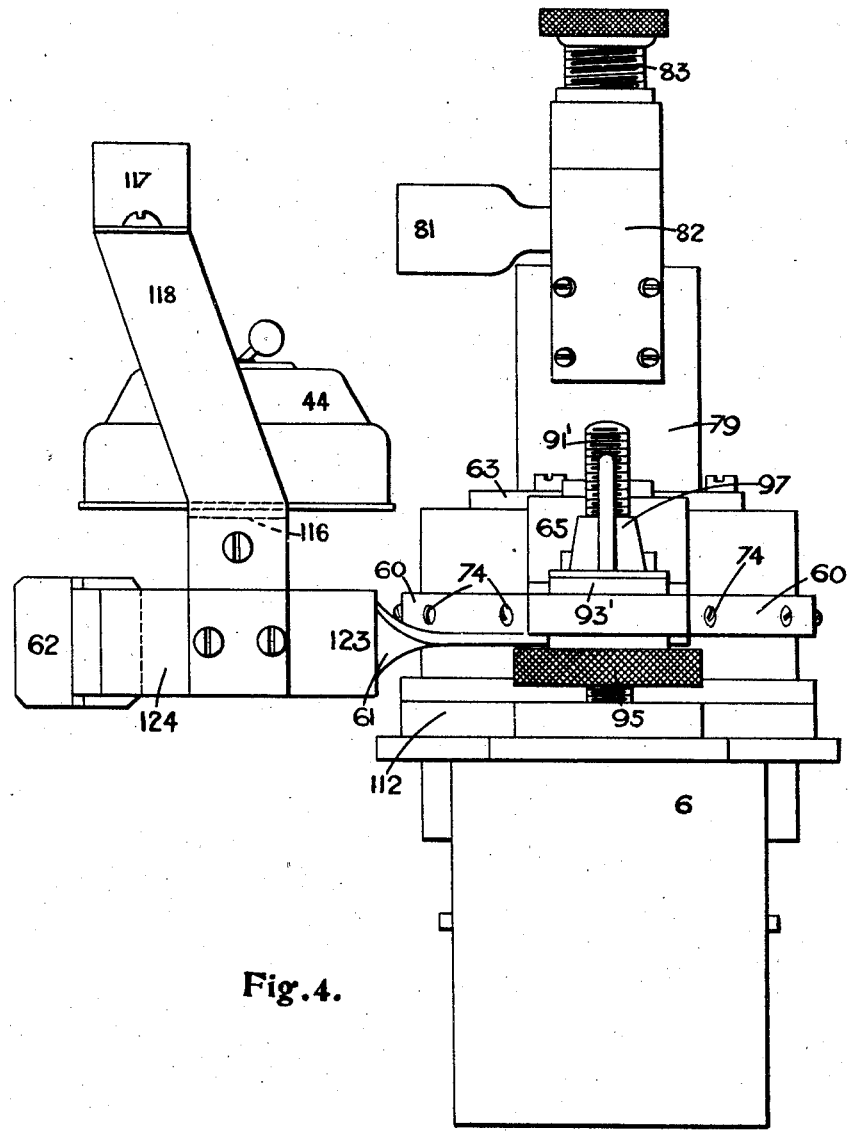
Figure 4 is a side view of Figure 3 looking in the direction of the arrow A.
Figure 5:
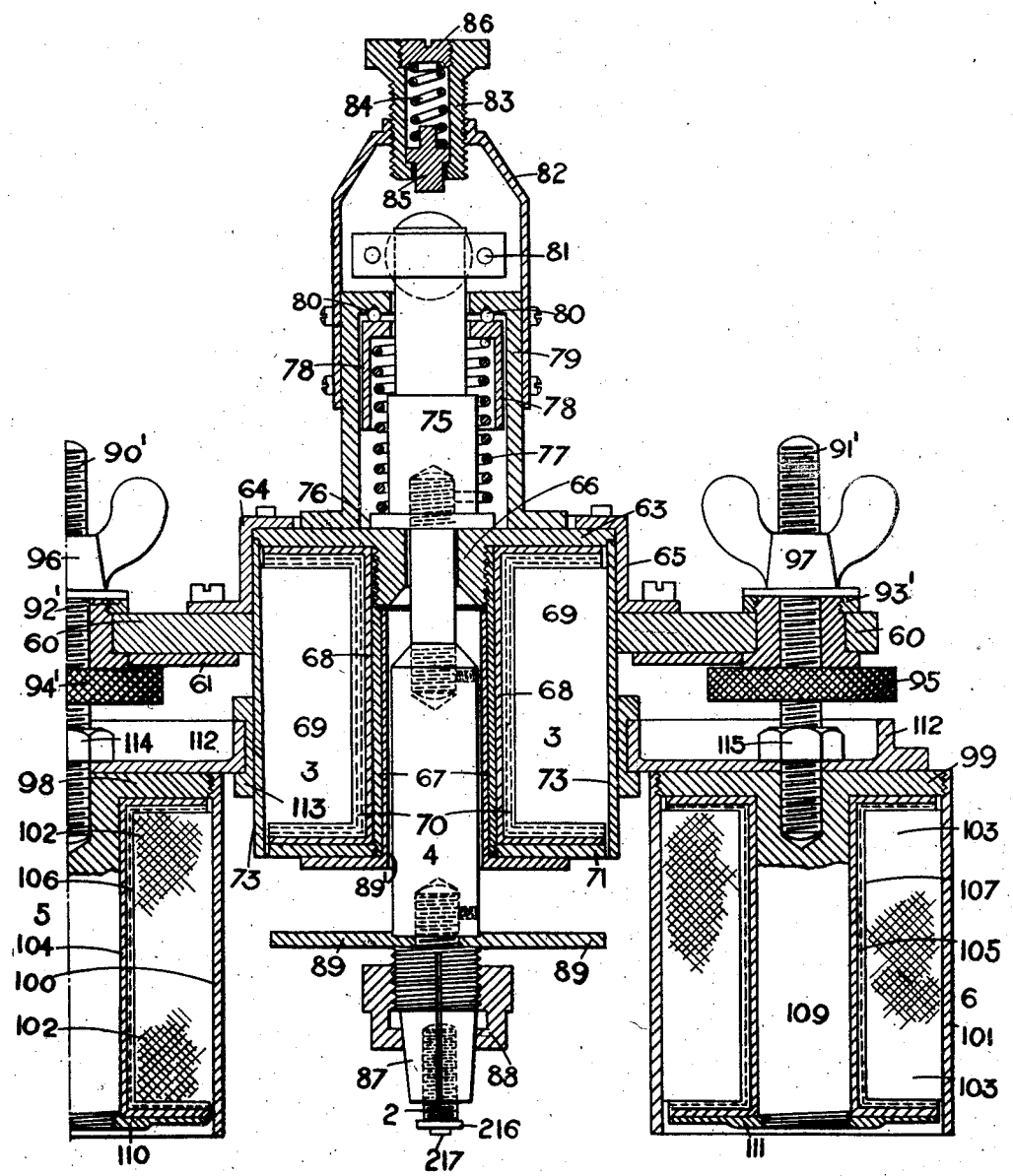
Figure 5 is a vertical section on the line B, C Figure 3.

The flexible cable 23 connected to the socket terminal 81 and the leads 35, 36, 37 and 38 which are collected to form a common flexible cable 29 are passed through and supported by straps 117, 118 secured to the flat bar 61. The cable 83 is thereafter connected to the terminal socket 81 a suitable amount of play being allowed the length of cable between the straps 117, 118 and the socket 81 to permit of the necessary movement of the stud-holder core 4 of the solenoid. The four leads 35, 36, 37 and 38 are separated from the common flexible cable 29 and thereafter connected to their respective terminals. 119, 120. Figure 3 are insulating bushes for the leading-in-wires to the coils 102, 103 of the pot-magnets 5, 6 and 121, 122 are the terminal bushes for the wires to the coil of the solenoid 3. If desired instead of or in addition to the straps 117, 118 the main cable 23 may be supported in a clip 123 and the four core cable in a clip 124 both clips being secured to the flat bar 61 as shown in Figure 3.

Figure 6:
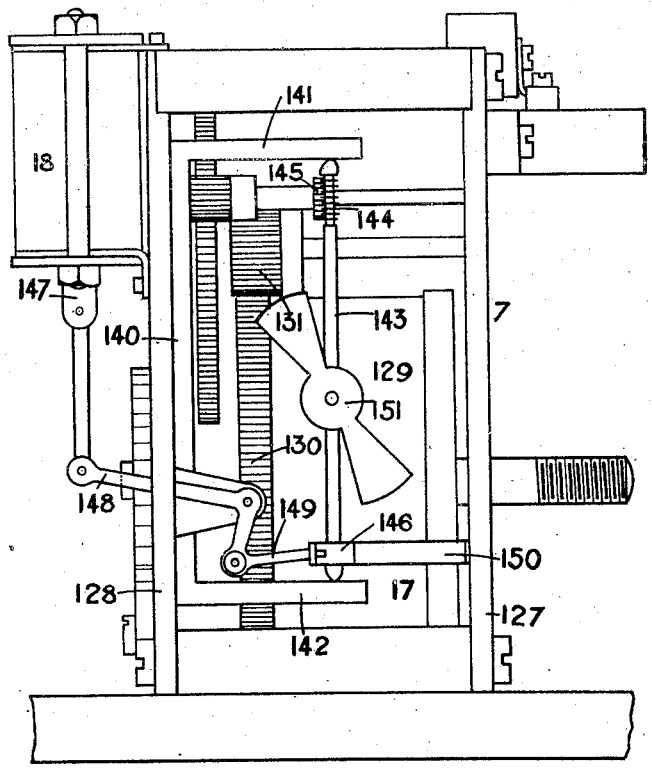
Figures 6, 7 and 8 are respectively an end elevation, a side elevation and a plan of the timing mechanism.
Figure 7:
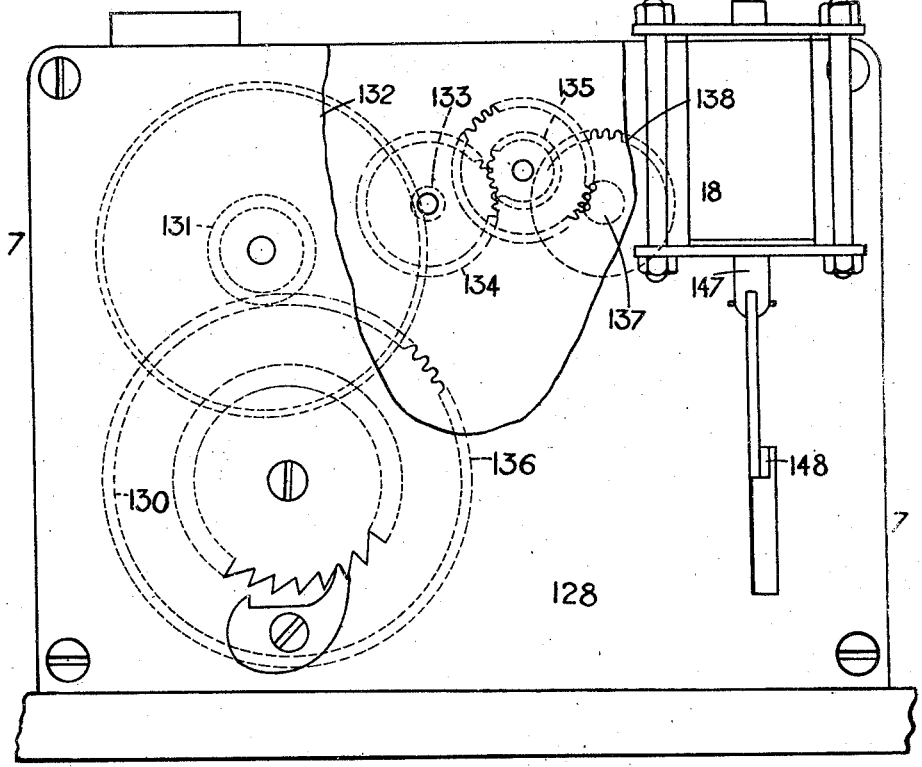
Figure 8:
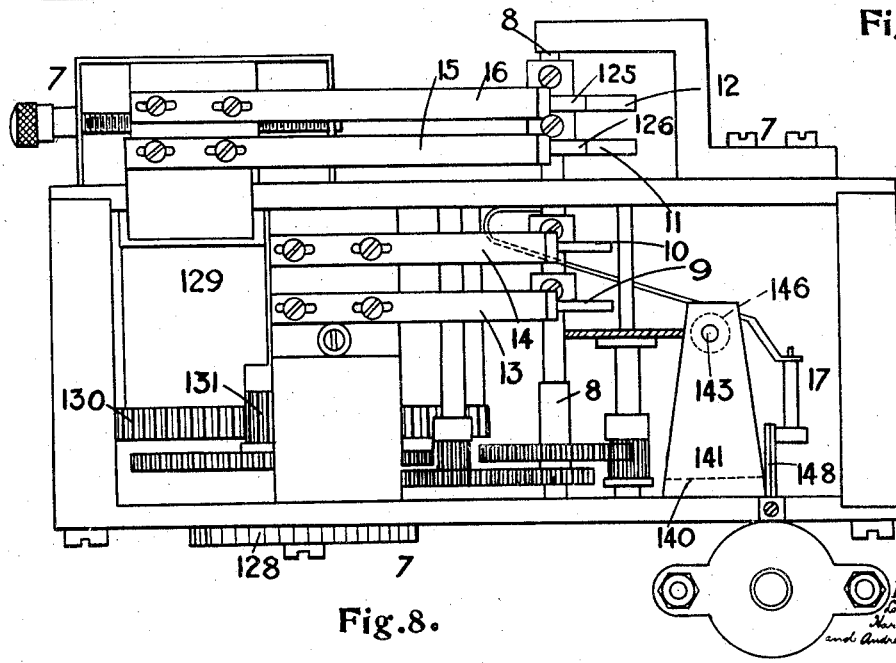

The timing and controlling mechanism 7 by which the whole sequence of operations is automatically controlled from the remote control switch 28 is shown in Figures 6, 7 and 8. This mechanism comprises the main shaft 8, cams 9, 10, 11 and 12 of which the cams 9 and 10 may be called a combination cam. The cams 9, 10 are incomplete each being formed or provided with a gap 125, 126 respectively, and the complete set of cams 9, 10, 11 and 12 are mounted so that they can be adjusted axially and circumferentially on the shaft 8. Relative adjustment of the two cams 9, 10 circumferentially thus alters the time period which elapses between the action of the cam 9 and the action of the cam 10. The cam 9 on rotation opens the circuit of brake release solenoid 18 whilst the cam 10 closes the circuit of the brake release solenoid 18, independently of the remote control switch or press button 28 which is inserted in parallel therewith, so that the press-button circuit can be opened when the cam circuit 9, 10 is closed without stopping the rotation of the shaft 8 of the timing mechanism. The cam 11 is employed to short circuit the coil of the solenoid 3 and the cam 12 which is an evolute cam controls the closing and opening of the main circuit contactor 24 and thereby also controls the closing and opening of the welding circuit and consequently the welding current. Closing of the main circuit contactor 24 energizes the shunt solenoid 3 which is de-energized by the short circuiting cam 11 before the cam 12 leaves the contact finger 16. The timing is finally adjusted by longitudinal displacement of the contact finger 16. The shaft 8 is supported in and between uprights 127, 128 and derives its motion from suitable clockwork mechanism comprising a barrel 129, in the interior of which is a coiled spring not shown and suitable gear wheels, 130, 131, 132, 133, 134, 135, 136, 137 and 138 suitably mounted on arbors carried by the uprights 127 and 128. A bracket 140 having horizontal arms 141, 142, supports there between a vertical shaft 143 on which is a worm 144 gearing with a worm wheel 145 or gear wheel, mounted on the arbor carrying the wheel 139. The vertical shaft 143 is provided with a collar 146. The core 147 of the brake release solenoid 18 is connected by a bell crank lever 148 and a link 149 to one end of a metal strip 150, the free end of which bears against the collar 146 on the vertical shaft 143 so as to act as a brake. Suitably secured to the vertical shaft 143 as by a spring clip or other suitable means is a fan brake 151.

The method of operation is as follows, it being assumed that the holding-on-pot-magnets and the solenoid stud-holder have been placed in the desired position relatively to the plate to which the stud is to be welded. The switch 44 is then operated so as to close the circuit through wire 35, coils of hold-on-pot-magnets 6, 5, switch 44, wire 38, plug 34, plug socket 38, wire 50, lamps 42, 41 wire 51, common negative terminal 52, wire 53 and apparatus main negative lead 23 to negative main 20. The coils of the holding-on-pot-magnets are thus energized independently of the main circuit and the stud-holder and solenoid are thus retained in the desired position against the plate 1. The switch 28 is then operated closing the circuit through the brake released solenoid 18, and thereby releasing the brake member 150 from the collar 146 so that the shaft 8 of the timing mechanism starts rotating. On rotation of the shaft 8 the cams 9 and 10 come in contact with the contact fingers 13, 14 which are normally (that is to say when the timing mechanism is inoperative) over the gaps, the circuit through the push-button switch 28 being thereby by-passed. The circuit through the brake release solenoid is thus maintained independently of the push-button-circuit, which can therefore be opened without affecting the brake release solenoid. Thereafter on further rotation of the shaft 8 the cam 12 engages the contact finger 16. As the result thereof, the solenoid 25 is energized thus closing contactor 24. The welding circuit is thus closed and current flows through the plate and stud. Simultaneously therewith the solenoid 3 becomes energized, the stud being therefore withdrawn against the action of the spring 77 out of contact with the plate 1 and the arc is struck. On further rotation of the cam shaft 8 the cam 11 engages the contact finger 15 thereby short-circuiting or shunting the solenoid 3 which thus becomes practically de-energized. The immediate effect thereof is that the spring 77 returns the stud 38 through the path or direction of the arc against and preferably at right angles to the plate and with sufficient pressure to effect the welding of the stud in position on the plate. The arc through the path or direction in which the stud is returned is thus maintained through being shortened until actual contact takes place between the stud and plate. On further rotation of the shaft 8 the cam 12 is disengaged from the contact finger 16 thereby de-energizing the solenoid 25 or opening circuit therethrough. Consequently the contactor 24 is opened and thereby the welding circuit. Cam 11 on further rotation of cam shaft 8 is disengaged from contact finger 15 so that the short circuit of solenoid 3 is removed. The shaft 8 continues to rotate until the gaps in the cams 9, 10 coincide or come opposite the ends of the respective contact fingers 13, 14, thereby opening the circuit through the brake release solenoid 18. The brake is thus applied to the timing mechanism which stops, and the cycle of operations may be repeated as often as desired by merely operating the push button switch 28.

Figure 9:
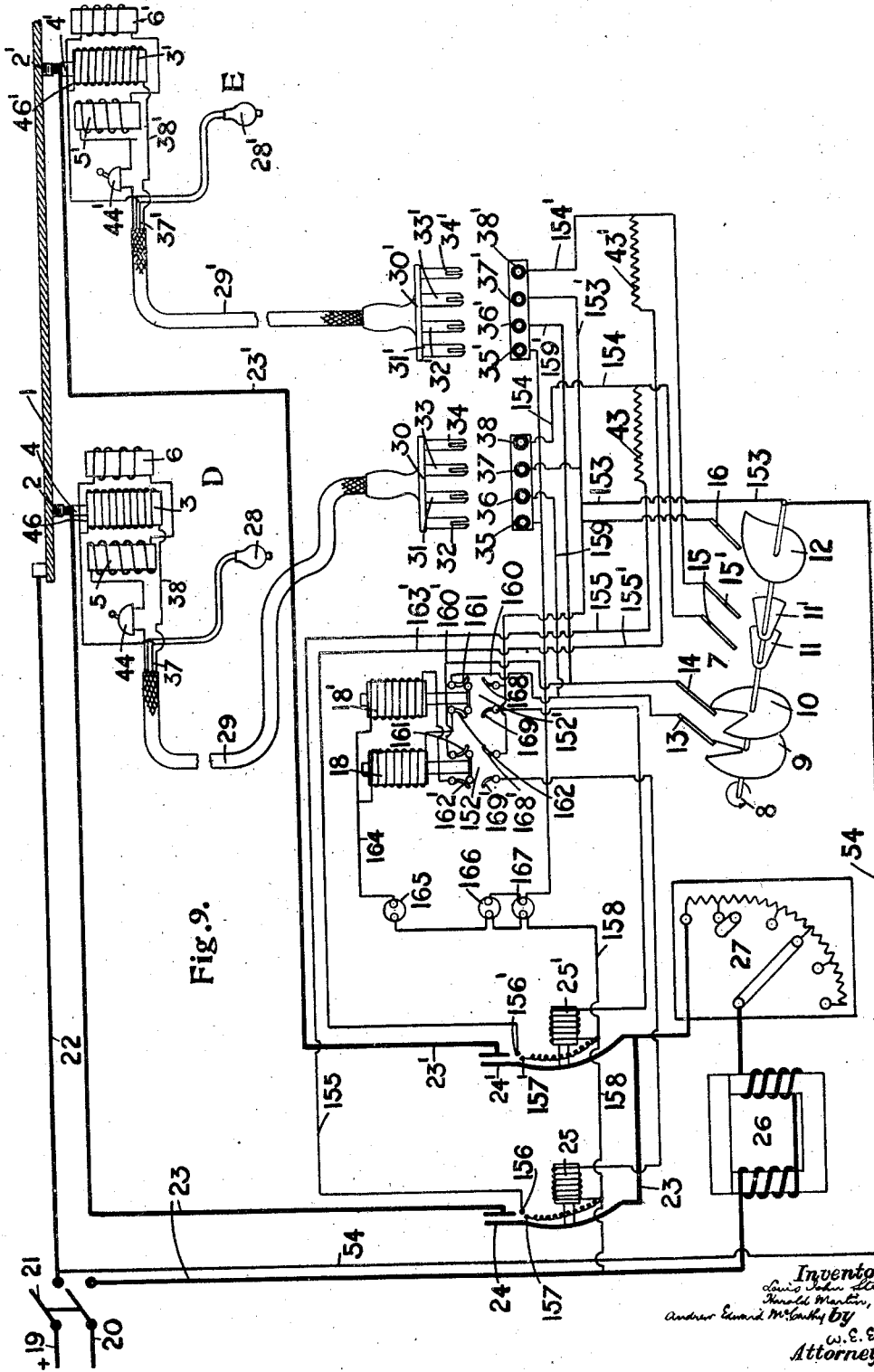
Figure 9 is a wiring diagram as used with two units or welders, that is to say two complete apparatus for use by different operators.

As shown in Figure 9 two welders D, E may be employed operated by different operators so that on the pressing of either of the press button switches 28, 28', the corresponding welder may be used, the sequence of operations being controlled by the timing mechanism which is similar to that hereinbefore described with reference to Figures 1, 6, 7 and 8.

The arrangement of apparatus and the electrical connections of Figure 9 with the mains 19, 20 are such as to preclude the two welders operating simultaneously but it should be understood that the electrical connections and the timing mechanism may be such as to permit of simultaneous or sequential operations of the two welders.

In Figure 9 the parts and connections of the E welder corresponding to those of the D welder are provided with indices so as to clearly distinguish the two welders and their connections. In order to provide for the use of two welders such as D and E the following parts apart from the additional welder are provided additional to those shown in Figure 1. In Figure 9 the additional parts are a contractor 24', an actuating solenoid 25' therefor, a negative main apparatus lead 23', a brake release solenoid 18', two discriminating switches 152, 152' and one came 11'. The timing mechanism 7,—brake release solenoids 18, 18′,—solenoids 25, 25′,—reactance coil 26,—variable resistance 27,—socket terminals 35, 36, 37, 38,—and 35′, 36′, 37′, 38′ are preferably arranged in one portable box, the flexible cables 29, 29′ being adapted for connection to the respective set of socket terminals by the brackets 30, 30′ carrying the plug switches 31 to 34, and 31′ to 34′ respectively. As the construction of the individual parts of the apparatus is the same as the corresponding apparatus of Figure 1 it is proposed to describe the welding operation as effected by the welder E the circuits of the welder D being clearly shown and the operation being the same as the welder of Figure 1. Referring to the welder E the welding circuit is from the positive main 19, switch 21 apparatus main positive lead 22, plate 1, stud 2′, lead 23′, contactor 24′, variable resistance 27, reactance coil 26, apparatus main negative lead 23 to negative main 20 by switch 21. The shunt solenoid circuit is from positive main 19, switch 21, wire 22, wire 54, wire 153, socket 37′, plug 33′, wire 37′ in flexible cable 29′, wire 46′, solenoid 3′, wire 38′, plug 34′, plug socket 38′, wire 154′, non-inductive resistance 43′, wire 155′, auxiliary contacts 156′, 157′ of contactor 24′, wire 158 to negative 23 and thence to main negative 20. On pressing the push button switch 28′ the circuit through the brake release solenoid 18′ is closed through wire 37′ (Figure 9), push 28′, plug 32′, socket 36′, wire 159′, wire 160′, contacts 161′, 162′ of discriminating switch 152, wire 163′ brake release solenoid 18′, wire 164, lamp 165, wire 158 and negative main 23. Solenoid 18′ is thus energized and the brake 160 of the timing mechanism 7 is released and the cam shaft 8 begins to rotate. The energization of solenoid 18′ opens the circuit through contacts 161, 162 and plunger of solenoid 18′ which plunger then closes on contacts 168, 169. 166 and 167 are resistance lamps having independent connection to the terminal sockets 35 and 35′ respectively as shown in Figure 9. The cores of the brake releasing solenoids 18 18′ are normally, when the solenoids are not energized, maintained against stops in the up or inoperative position. The opening of contacts 161, 162 opens the circuit through solenoid 18 and the closing of contacts 168, 169 closes the gap in the solenoid circuit 25′ so as to allow of the said solenoid 25′ being energized at the proper time through the timing mechanism 7. The timing mechanism is connected to the respective solenoids 25, 25′ which actuate the contactors 24, 24′ through the gaps in the discriminating switches 152, 152′. As soon as the timing mechanism brake is released the shaft 8 as above stated begins to rotate and the cams 9 and 10 come into contact with the contact fingers 13, 14 which are normally over the gaps in the respective cams. The circuit through push button 28′ is thereby cut out and the circuit through the brake release solenoid 18′ and cam 10 is maintained independently of the circuit through the push button 28′. On the cam 12 engaging the contact finger 16 the solenoid 25′ is energized closing contactor 24′. Simultaneously therewith the main or welding circuit is closed through the plate and stud and the solenoid 3′ is energized, thereby withdrawing stud against spring action from contact with the plate and striking of the arc is thus effected. On further rotation of the cam shaft 8 cam 11′ engages finger 15′ thereby short circuiting or shunting solenoid 3′ which thus becomes de-energized, so that the spring returns the stud through the path or direction of the arc against and preferably at right angles to the plate and with sufficient pressure to effect the welding of the stud in position on the plate. The arc through the path or direction in which the stud is returned is thus maintained through being shortened until actual contact takes place between the stud and plate. Further rotation of the cam shaft 8 causes cam 12 to become disengaged from the contact finger 16 thereby de-energizing and consequently opening the circuit through the solenoid 25′. Consequently contactor switch 24′ opens and main welding circuit is broken. Thereafter cam 11′ clears contact finger 15′, thus removing the short circuit to solenoid 3′. The cam shaft 8 continues to rotate until the gaps in cams 9 and 10 coincide with the ends of contact fingers 13, 14. The circuit through brake release solenoid 18′ is therefore opened and the brake is applied to the timing mechanism 7 so that rotation of the cam shaft 8 ceases, whilst at the same time, the contacts 168, 169 are opened and the contacts 161 and 162 are closed through the plunger of the brake release solenoid 18′. Incidentally the lamp resistance 165 lights up and indicates when current flows through the solenoids 18 or 18′.

Figure 12:
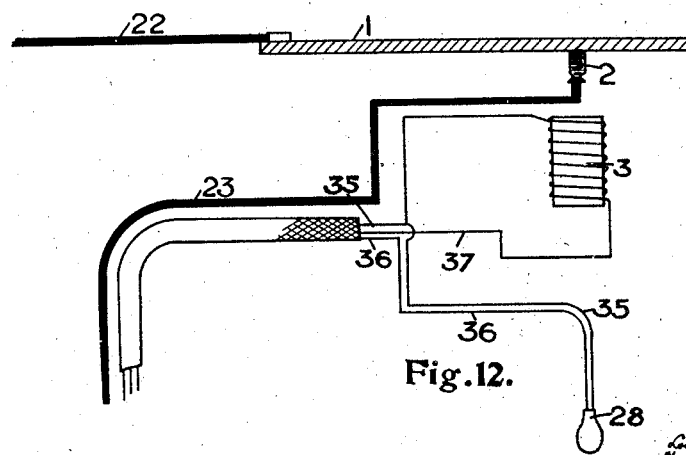
Figure 10:
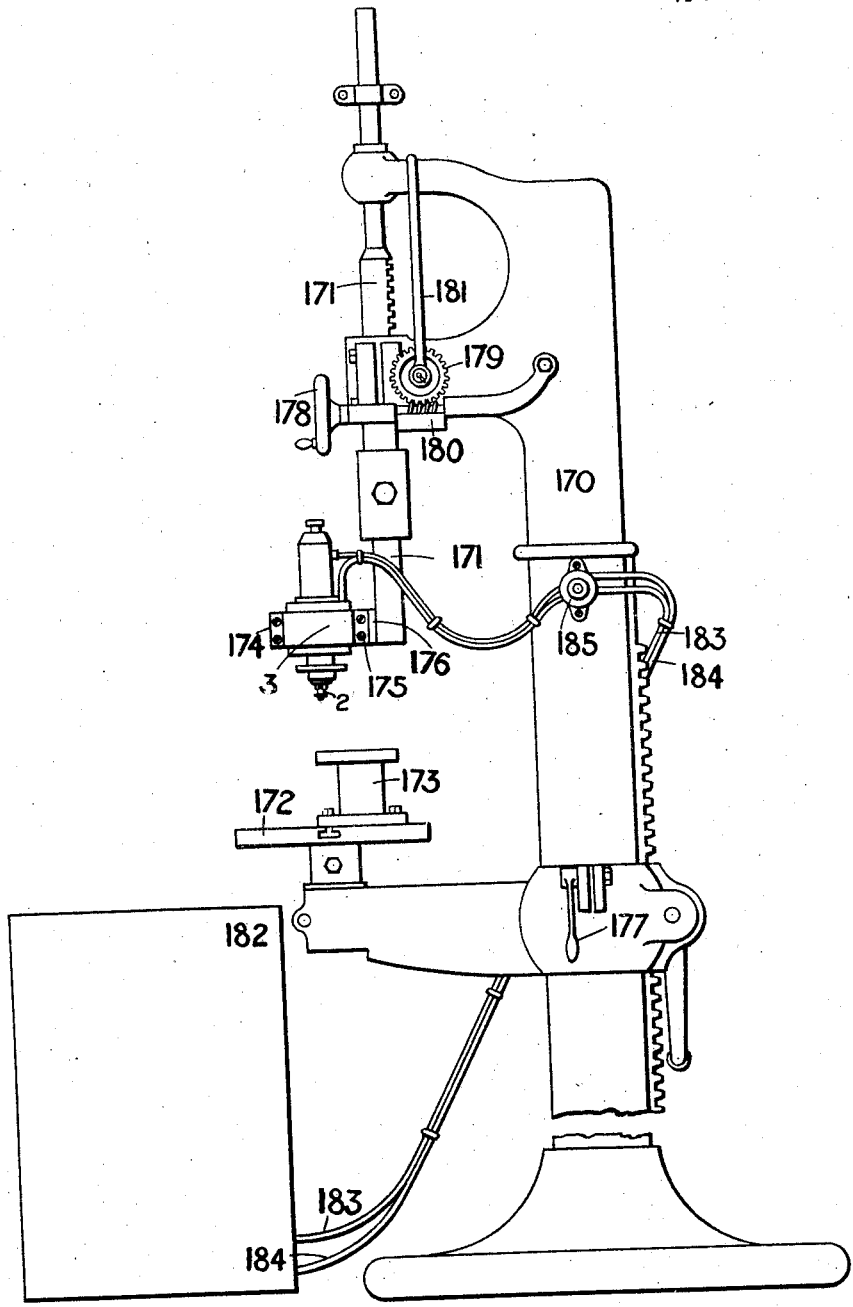
Figure 10 is an elevation of a fixed or non-portable type of apparatus.

Figure 10 shows an arrangement wherein the apparatus is stationary, the solenoid 3 in this arrangement being carried by the spindle of a post drill 170. 171 is the drill spindle, 172 the table or support for the piece 173 to which the stud 2 is to be welded and 3 as before is the solenoid stud-holder. In this construction and arrangement the holding-on-pot-magnets 5, 6 are omitted and the solenoid 3 is supported in position on the slidable spindle 171 by a clamping member formed of half hoop metal straps 174 secured by bolts 175 to a lateral member 176 projecting from the spindle 171. The table 172 is adjustable on the standard 170 and may be clamped in any desired position thereon by the clamping handle 177. 178 is a hand wheel operating member which on rotation causes the spindle 171 to ascend or descend as required, the said spindle being suitably geared to the hand wheel shaft. Sudden or abrupt release of the spindle 171 may be effected by gear 179, 180 and handle 181 of any well known construction. As shown in Figure 10 the timing mechanism is carried in a portable box 182 the necessary flexible cables 183, 184 being led therefrom to the solenoid 3. The said cables are preferably supported in a clamping bracket 185 on the standard or post 170. The interior construction of the solenoid 3 is practically the same as that described with reference to Figures 1, 2, 3, 4 and 5, and it is thought that further description thereof is unnecessary. The circuit through the solenoid 3 for the construction shown in Figure 10 is shown in Figure 12.

It has been found that with certain sizes and qualities of studs and the like, a heavy mechanical pressure is required upon replacement of the stud on the plate in order to effect satisfactory welds and the fluid controlling and actuating mechanism shown in Figures 14, 15 and 16 may be employed with this end in view and/or as a substitute apparatus for the electrical and mechanical apparatus and mechanism hereinbefore described. In the construction and arrangement therein shewn the stud-holder-chuck is mounted on the end of a rod 186 carrying a piston 187 arranged to reciprocate under the action of compressed air in a hollow cylinder 188. The cylinder 188 may be of a portable nature or may be provided with means such as metal straps 189, 190 for connecting the cylinder to and supporting the latter from a stationary object. The cylinder 188 is coupled by suitably shaped tubes 191, 192 to a valve casing 193 provided in its interior with two disc valves 194, 195 mounted on a common rod 196 and adapted to be displaced in opposite directions by the action of a solenoid hereinafter described.

The cylinder 188 is provided with ports 198, 199 through which compressed air is admitted to the respective sides of the piston 187, the spent air also exhausting through the said ports, pipes 191, 192 and opposite ends of the rod 196 to the atmosphere. The rod 196 is hollow at each end and is provided with through way openings 200, 201 which at the proper time effect communication between the pipes 191, 192 and the atmosphere through the passages 202, 203 in the respective end of the rod 196. The rod 196 and the valves 194, 195 are actuated by a solenoid 204, the core 205 of which is coupled to the rod 196 by links 206, 207, 208 the link 207 being pivotally supported by an arm 209 suitably secured to the valve casing 193. 209′ is the terminal socket for attachment of the main circuit cable to the stud-holder which in this case is fixed to the rod 186. The solenoid 204 is carried by and clamped to the valve casing 193 by straps 210, 211, and the core 205 of the solenoid is actuated against the action of a spring 212. 197 is a two-way valve having a passage 213 therein which can be placed in communication with an air inlet 214, or alternatively with the atmosphere at 215. The air supply pipe which is preferably of the flexible type is connected to the port 214; or the port 215 may be connected to the air supply pipe and the port 214 with the atmosphere.

The position of the rod 186 is adjusted by means of the drill spindle 171, Figure 10, the length of the arc being controlled by means of the plug 83 previously described with reference to Figures 2, 3, 4 and 5.

In operation the solenoid 204 when in the position shown is de-energized so that the rod 196 is also in the position shown, the piston 187 being therefore forced in the direction of the plate so that the stud comes into contact with the plate. The welding circuit through the stud and plate by way of the terminal 209 is closed and the solenoid 204 is energized simultaneously therewith, preferably from an independent source of supply. The result is that the rod 196 is moved through the links 206, 207, 208 by the core 205 of the solenoid so that the valve 194 closes on its seat and the valve 195 thus opens. At the same time compressed air admitted through the valve 197 flows by the valve 195, pipe 192 to the underside of the piston 187. As the rod 196 moves downwards to the closing position of the valve 194 on its seat, the compressed air on the upper side of the piston is suddenly released and escapes through the tube 191, openings 200 and passage 202 to the atmosphere. The piston 187, rod 186 and stud is thus withdrawn from the plate and the arc is struck. On the de-energization or short-circuiting of the solenoid 204 the rod 196 is moved upward by the action of the spring 212, and compressed air is admitted above the piston 187. As the pressure on the underside of the piston has now been relieved the stud is returned through the path or direction of the arc against and preferably at right angles to the plate and with sufficient pressure to effect the welding of the stud in position on the plate. The arc through the path or direction in which the stud is returned is thus maintained through being shortened until actual contact takes place between the stud and plate. Thereafter the main circuit or welding current is opened and the cycle of operations is repeated as often as desired. It should be understood that the movement of the valve 197 the energization and de-energization of the solenoid 204 and the opening and closing of the main or welding circuit is automatically controlled by suitable timing mechanism such as hereinbefore described.

If desired by the addition of a suitable cam, contact lever or finger to the timing mechanism and a lead or leads therefrom to a suitable solenoid valve operating mechanism, the valve 197 may be operated and controlled automatically.

The best results as regards uniform reliable welds of high mechanical strength have been obtained by the form of stud shown in Figure 17. The stud 2 is provided with a shoulder 216 of circular form adjacent the plate end of the stud and a small circular part 217 projecting therefrom, so as to facilitate striking and centralization of the arc. The end of the small circular projecting part 216 is preferably bevelled off slightly or slightly rounded so as to further facilitate striking and centralization of the arc. The welding end or the shoulder 216 thereon or both the end and the shoulder of the stud may be coated with a suitable flux composition.

If desired, the pot-magnet holding-on type of apparatus may be replaced by a solid or built up triangular framework having a projecting member at each apex of the triangle carrying a suitable coil or coils, the stud-holder solenoid being suitably disposed on and supported by the triangular framework. Each projecting member is preferably formed of soft iron but one or more than one of the projecting members may be of brass or other non-magnetic material. Each coil may be wound on a projecting member or on any suitable part of the triangular framework which in either construction may be entirely of magnetic material or partly of non-magnetic material and partly of magnetic material. This construction provides for a three point support for regular or irregular surfaces and allows of easy adjustment of the stud carrying member relatively to holding members so as to facilitate the welding of the stud in more inaccessible places or positions.

Obviously when using the apparatus for welding by alternating current, different accessories other than the resistance 27 and the reactance coil 26 will be required. It would be unnecessary to replace these when the source of the main welding supply current is a suitable transformer but in some cases such as when taking the alternating current supply from ordinary power mains a special transformer or reactance preferably of an adjustable current limiting type would be used.

The apparatus may be used for any size of stud and plate provided provision be made for adjustment of current, timing and polarity (with direct current welding).

It will be understood that in the claims "stud actuating means" comprise any means such as described for actuating the stud, that is to say a spring, or pneumatic, hydraulic or electro-magnetic means.

We claim:

1. A method of electrically welding metallic parts such as studs to metallic bodies wherein the stud is moved by automatic operating stud actuating means through the path or direction of an electric arc formed between the metallic body and the metallic part, into contact with the said metallic body so as to effect welding of the stud thereto, the welding current being maintained until completion of the weld.

2. A method of electrically welding metallic parts such as studs to metallic bodies, wherein the stud is moved by a spring through the path or direction of an electric arc formed between the metallic body and the metallic part into contact with the said metallic body so as to effect welding of the metallic part thereto, the welding current being maintained until the completion of the weld.

3. A method of electrically welding metallic parts such as studs to metallic bodies, wherein the metallic part is moved through the path of an electric arc formed between the metallic body and the metallic part, in which the operations comprising striking the arc and the return of the metallic part to the metallic body are automatically effected.

4. A method of electrically welding metallic parts such as studs to metallic bodies, wherein the metallic part is moved through the path of an electric arc formed between the metallic body and the metallic part, in which the arc is maintained automatically for a determined period.

5. A method of electrically welding metallic parts such as studs to metallic bodies wherein the stud is moved through the path of an electric arc formed between the metallic body and the metallic part into contact with the said metallic body so as to effect welding of the metallic part thereto, the arc being maintained for a determined period under electrical control.

6. A method of electrically welding metallic parts such as studs to metallic bodies, wherein the metallic part is moved through the path of an electric arc formed between the metallic body and the metallic part, into contact with the said metallic body so as to effect the welding of the metallic body thereto, the welding current being maintained under electrical control until the weld is effected.

7. A method of electrically welding metallic parts such as studs to metallic bodies, wherein the metallic part is moved through the path of an electric arc formed between the metallic body and the metallic part into contact with the said metallic body so as to effect welding of the metallic part thereto, the arc being maintained under electrical control for a determined period and the welding current being maintained under electrical control until the weld is effected.

8. A method of electrically welding metallic parts such as studs to metallic bodies, wherein the metallic part is moved through the path of an electric arc formed between the metallic body and the metallic part, into contact with the said metallic body so as to effect the welding of the metallic body thereto, the welding current being maintained until the weld is effected, the operations being electrically controlled and the time period of the operations being determined by automatic means.

9. A method of electrically welding iron, steel, brass and other metallic parts such as studs to metallic bodies such as iron, steel and other plates, and castings which consists in closing an electric circuit through the plate or casting and the metallic part to be welded thereto, to obtain a welding current, separating the metallic part from the metallic body or vice versa, to effect striking of an electric arc between the metallic body and the metallic part, maintaining the arc and welding current for a suitable time interval and subsequently but before interrupting the flow of the main or welding current through the metallic body and the metallic part, moving the metallic part through the path or direction of the arc into contact with the metallic body so as to effect welding of the metallic part thereto the sequence of operations being electrically controlled.

10. A method of electrically welding metallic parts such as studs to metallic bodies which consists in closing an electric circuit through the metallic part and metallic body to obtain a welding current, withdrawing the metallic part or the body against the action of resilient means out of contact with the metallic body or the metallic part to strike an arc therebetween by the electro-magnetic action of a shunt solenoid, or by a solenoid which can be deenergized independently of the circuit through the metallic body and the metallic part, maintaining the said arc for a suitable time interval, shunting the current through the coil of the said solenoid or de-energizing the said solenoid so as to allow the aforesaid resilient means to force the metallic part through the path or direction of the arc into contact with the metallic body so as to effect welding of the metallic part thereto, the sequence of operations being electrically controlled.

11. Apparatus for effecting the electric welding of metallic parts such as studs to metallic bodies, comprising means to obtain a welding circuit through the metallic part and body and means to close and open the said circuit, means for retaining or holding the metallic part, means to maintain the metallic part and the retaining or holding means in position relatively to that part of the metallic body to which the metallic part is to be welded, means to separate the metallic part from contact with the body to effect the formation of an electric arc between the metallic part and body, and timing means adapted to determine the time period of each operation automatically.

12. Apparatus for effecting the electric welding of metallic studs to metallic bodies such as plates, and castings comprising a solenoid having a stud carrying core or plunger adapted on energization to withdraw the stud against the action of a spring out of contact with the body, so as to strike an electric arc between the stud and body, holding on magnets and means to energize the said magnets independently of the main or welding circuit, so as to clamp the apparatus in position on to the metallic body and timing mechanism adapted to control the sequence of operations automatically.

13. Apparatus for effecting the electric welding of metallic studs to metallic bodies such as plates, and castings wherein the operations comprising striking the arc and the return of the metallic stud to the plate are automatically effected; comprising a solenoid adapted to be energized independently of the welding circuit through the stud and metallic body and having its core or plunger adapted to act as a stud-holder or provided with an attachable stud-holder and resilient means to force the stud into contact with the metallic body on shunting, short-circuiting, open circuiting or de-energization of the stud-holder solenoid.

14. In apparatus for effecting the electric welding of metallic studs to metallic bodies, according to the method wherein the operations comprising striking the arc and the return of the metallic stud to the plate are automatically effected, a solenoid stud-holder and holding-on-magnets, the coils of the stud-holder and the holding-on-magnets preferably being so wound or connected as to give the same polarity at the ends of the cores thereof adjacent the plate to which the stud is to be welded.

15. In apparatus for effecting the electric welding of metallic studs to metallic bodies according to the method wherein the operations comprising striking the arc and the return of the metallic stud to the plate are automatically effected, a solenoid stud-holder and means for adjusting the stroke of the stud-holder solenoid core or plunger and consequently the length of arc.

16. Apparatus for electrically welding studs wherein the operations comprising striking the arc and the return of the metallic stud to the plate are automatically effected and, wherein the means for setting or obtaining the correct length of the arc comprise a hollow plug screwed externally and adjustably mounted and supported on the framework of the apparatus, the said plug having a slidable plunger in the interior thereof normally projected therefrom by suitable resilient means, the projecting portion of the slidable plunger being of constant and of definite length.

17. Apparatus for effecting the electric welding of metallic studs to metallic bodies according to the method wherein the operations comprising striking the arc and the return of the metallic stud to the plate are automatically effected and wherein the stud-holder solenoid casing is provided with an upwardly or rearwardly extending casing open on opposite sides for the purpose hereinbefore explained.

18. Apparatus for effecting the electric welding of metallic studs to metallic bodies comprising a stud-holder solenoid, holding-on-magnet means associated therewith, the said stud-holder solenoid and holding-on-magnets being mounted on a common support, and means for adjusting the relative position of the stud-holder solenoid and the holding-on-magnets, substantially as described.

19. Apparatus for electrically welding studs to metallic bodies wherein the sequence of operations during the welding is automatically controlled by timing mechanism comprising a shaft, a plurality of cams mounted thereon, a corresponding number of contact members or levers adapted to be engaged by the respective cam, means to rotate the said shaft automatically and means to stop the shaft after a predetermined interval.

20. Apparatus in accordance with claim 19 wherein the peripheral continuity of two of the cams is interrupted so as to form a gap in each cam for the purpose hereinbefore explained.

21. Apparatus in accordance with claim 20, wherein two adjacent cams are provided with a discontinuous cam surface, the two cams acting as a combination cam for the purpose hereinbefore explained.

22. Apparatus in accordance with claim 19, provided with a brake device normally operative to stop rotation of the cam shaft, and solenoid actuated means to release the said brake and permit rotation of the cam shaft during a definite period.

23. Apparatus in accordance with claim 19, wherein the contact members or levers co-acting with the cams are adjustable towards and from the cams for the purpose hereinbefore explained.

24. Apparatus in accordance with claim 19, wherein the setting of the timing mechanism is effected by the longitudinal displacement of a contact member or lever towards or from its co-acting cam.

25. Apparatus in accordance with claim 19, wherein the several cams, comprise a brake release cam, a cam adapted to de-energize the solenoid effecting the brake release, a welding circuit cam, and a cam to shunt the circuit through the stud-holder solenoid, the said cams being rendered operative on the actuation of a single control member.

26. Apparatus for effecting the electric welding of metallic studs to metallic bodies wherein the operations comprising striking the arc and the return of the metallic stud to the plate are automatically effected and, wherein a plurality of welders adapted for use by a number of operators are controlled by a single timing mechanism.

27. Apparatus for effecting the electric welding of metallic studs to metallic bodies comprising means to obtain a welding circuit through the stud and plate, means to open and close the said welding circuit, a stud-holder solenoid adapted to be mechanically clamped in operative position, means to open and close a circuit through the said stud-holder solenoid, and timing mechanism adapted to control the sequence of the welding operations automatically.

28. Apparatus for effecting the electric welding of metallic studs to metallic bodies according to the method wherein the operations comprising striking the arc and the return of the metallic stud to the plate are automatically effected, comprising a hollow cylinder having a piston therein provided with a piston rod adapted to act as a stud-holder, means to supply electric current to the said stud-holder, means to deliver compressed air to each side of the piston and means to control the movements of the piston to effect welding of the stud to the plate.

29. An apparatus in accordance with claim 27, a pair of valves mounted on a common rod having a passage at each end and an opening or openings in the said rod adapted to communicate with the respective passage so as to allow the escape of the compressed air from the piston to the atmosphere.

30. An apparatus in accordance with claim 28, the provision of a solenoid adapted to operate the rod on which the pair of valves are mounted so as to control the admission of and escape of compressed air to the hollow cylinder carrying the stud-holder.

31. In apparatus in accordance with claim 29, the provision of a valve adapted to control the admission of compressed air to the electro-magnetically actuated valve rod carrying the pair of valves, and to relieve the pressure of air in the apparatus.

32. In apparatus according to claim 26, an automatically actuated valve adapted to control the admission of compressed air to the electro-magnetically actuated valve rod carrying the pair of valves and to relieve the pressure of air in the apparatus.

33. A method of electrically welding metallic parts such as studs to metallic bodies, consisting in securing the stud in a holder, clamping the holder to the metallic body, closing the welding circuit through the metallic body and the metallic part to be welded thereto, separating the metallic part from the metallic body to strike an arc between them, allowing the arc to continue for an automatically determined time interval, and again forcing the metallic part into contact with the metallic body.

34. A method of electrically welding metallic parts such as studs to metallic bodies, consisting in securing the metallic part in a holder subject in one direction to the action of an electro-magnet and in the opposite direction to the action of a spring, electro-magnetically clamping the holder to the metallic body with the metallic part in contact therewith, closing the welding circuit and the circuit of the electro-magnet acting upon the holder of the metallic part, thus separating the metallic part from the metallic body to form an arc between them, allowing the arc to continue for an automatically determined time interval, and automatically opening the circuit of the electro-magnet and the welding circuit to allow the spring to press the metallic part against the metallic body for effecting the weld.

35. Apparatus for electrically welding metallic parts such as studs to metallic bodies, comprising a welding frame, a solenoid secured upon the frame, a holder for the metallic part, said holder being subject to the action of the solenoid, a spring also acting upon the holder in opposition to the action of the solenoid, means for clamping the frame to the metallic body, means for adjusting and securing the metallic part in the holder so as to be pressed by the spring into contact with the metallic body, a welding circuit including within it the metallic part and the metallic body, a controlling circuit including the solenoid winding, and means for closing and opening the welding and controlling circuits.

36. Apparatus for electrically welding metallic parts such as studs to metallic bodies, comprising a welding frame, a solenoid mounted upon the frame, a holder for the metallic part, said holder being acted upon by the solenoid, a spring also acting upon the holder in opposition to the action of the solenoid, an electro-magnet mounted upon the frame and adapted when energized to electro-magnetically secure the frame to the metallic body, a circuit including within it the winding of the said electro-magnet, a welding circuit including within it the said metallic part and the said metallic body, a controlling circuit including within it the solenoid winding and means for controlling the said circuits.

37. Apparatus for electrically welding metallic parts such as studs to metallic bodies such as iron plating, comprising a welding frame, an iron clad solenoid mounted on the frame, a holder for the metallic part attached to the core of the solenoid, a spring acting upon the holder in opposition to the action of the solenoid, a pair of iron clad electro-magnets mounted upon the frame one on each side of the solenoid, the solenoid and the pair of electro-magnets being arranged with similar magnetic poles towards the metallic body, a circuit including within it the windings of the two iron clad electro-magnets, a welding circuit including within it the said metallic part and the said metallic body, a controlling circuit, including within it the solenoid winding, and means for controlling the three circuits.

38. In apparatus for electrically welding metallic parts such as studs to metallic bodies such as iron plating, the combination with a welding frame of a weld controlling solenoid with two clamping electro-magnets, and means for adjusting the clamping electro-magnets in correct relation on the frame relatively to the weld controlling solenoid.

39. In apparatus for electrically welding metallic parts such as studs to metallic bodies such as iron plating, wherein the operations comprising striking the arc and the return of the metallic part to the metallic body are automatically effected, the combination with the controlling circuit of a time switch in the said circuit for automatically controlling the duration of the welding arc.

40. In apparatus for electrically welding metallic parts such as studs to metallic bodies such as iron plating, the combination with a controlling solenoid and a circuit containing its winding of a time switch in the said circuit adjusted to open on the lapse of time to which it is adjusted, a welding circuit containing the metallic part and the metallic body to which it is to be welded, a normally open contactor in the welding circuit, an operating coil therefor, an overload circuit breaker in series with the said coil, an excess current operating coil for the circuit breaker connected in the welding circuit and manually operated means for closing the various circuits to effect the weld.

41. In apparatus for electrically welding metallic parts such as studs to metallic bodies such as iron plating, the combination with a controlling solenoid of an operating winding for the same, a welding circuit containing the metallic part, a releasing winding on the solenoid acting in opposition to the operating winding of the same, a circuit containing the releasing winding and a normally open time switch in the said circuit adapted to close after a predetermined time interval.

42. In apparatus for electrically welding metallic parts such as studs to metallic bodies, such as iron plating, the combination with an iron clad solenoid and plunger for controlling the welding operation, of a stud holder secured to the free end of the said plunger, a disc of magnetic material surrounding and fixed to the plunger adjacent to the face of the solenoid, an insulating sleeve surrounding the plunger, and a flange mounted on the lower end of the said sleeve and intervening between the said disc and the adjacent face of the solenoid, substantially as described.

43. In a solenoid and plunger for controlling electrical welding apparatus, a holder secured to the free end of the plunger for holding one of the parts to be welded, a cap mounted upon the solenoid, having a closed upper end, an inwardly projecting flange within the cap between the ends of the same, a spindle connected to the solenoid plunger projecting into the cap, a flange fixed upon the spindle, a coil spring arranged between the said flange and the fixed flange within the cap, a knob terminating the upper end of the said spindle, and an adjusting screw working in a screw-threaded hole in the closed end of the cap adapted to form an adjustable abutment to be engaged by the said knob on the solenoid being energized, substantially as described.

44. In electrical welding apparatus, the combination with a welding circuit of electro-magnetic means for controlling the said circuits, one or more operating circuits for the said controlling means, and a hand operated switch controlling the said operating circuits, comprising a device normally tending to open the switch and to retain it open, contacts for closing the operating circuit or circuits, a hold-on coil in series with one of the operating circuits closed by the switch, and an armature of the hold-on coil carried by the movable switch member, the arrangement being such that on the operating circuit being opened by the weld controlling means, the hold-on coil of the switch is de-energized, substantially as described.

LOUIS JOHN STEELE.
HAROLD MARTIN.
ANDREW EDWARD McCARTHY.